(12) United States Patent
Gan et al.

(10) Patent No.: US 8,400,432 B2
(45) Date of Patent: Mar. 19, 2013

(54) WRITING DEVICE AND IMAGE DISPLAY APPARATUS

(75) Inventors: Taijyu Gan, Ebina (JP); Hiroshi Arisawa, Ebina (JP); Haruo Harada, Ebina (JP); Takashi Morikawa, Ebina (JP); Chisato Urano, Ebina (JP); Yasunori Okano, Tokyo (JP); Atsushi Hirano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 648 days.

(21) Appl. No.: 12/618,367

(22) Filed: Nov. 13, 2009

(65) Prior Publication Data

US 2010/0315385 A1 Dec. 16, 2010

(30) Foreign Application Priority Data

Jun. 10, 2009 (JP) ................................. 2009-139488

(51) Int. Cl.
*G06F 3/033* (2006.01)
(52) U.S. Cl. ........................................ 345/179; 345/183
(58) Field of Classification Search .................. 345/179, 345/182; 178/19.01, 19.02, 19.05
See application file for complete search history.

(56) References Cited

U.S. PATENT DOCUMENTS

| 7,102,628 | B2 * | 9/2006 | LeKuch et al. | 345/182 |
| 7,116,309 | B1 * | 10/2006 | Kimura et al. | 345/105 |
| 2006/0232566 | A1 * | 10/2006 | Hirakata | 345/173 |
| 2008/0179113 | A1 * | 7/2008 | Carlson et al. | 178/19.01 |

FOREIGN PATENT DOCUMENTS

| JP | A 11-237644 | 8/1999 |
| JP | A 2007-241405 | 9/2007 |

* cited by examiner

*Primary Examiner* — Adam R Giesy
(74) *Attorney, Agent, or Firm* — Oliff & Berridge, PLC (57) ABSTRACT

A writing device includes: a voltage application unit that applies a voltage to a display medium including a first display layer, second display layer and a photoconductive layer; a first obtaining unit that obtains image data showing an original image; a controller that controls the voltage application unit and the irradiating unit to cause the display medium to show an overlapped image including the obtained original image and an overwritten image overwritten on the original image, the overwritten image including a point corresponding to the location shown by the location information stored in the storage unit.

7 Claims, 6 Drawing Sheets

PLEASE SELECT A COLOR OF THE OVERWRITTEN IMAGE.
 (1) WHITE
 (2) BLACK
 (3) RED
 (4) BLUE
 (5) GREEN

PLEASE SELECT A COLOR OF THE OVERWRITTEN IMAGE.
(1) YELLOW-GREEN
(2) BLACK
(3) RED
(4) BLUE-GREEN

WRITING DEVICE AND IMAGE DISPLAY APPARATUS

CROSS-REFERENCE TO RELATED APPLICATIONS

This application claims priority under 35 USC 119 from a Japanese patent application No. 2009-139488 filed on Jun. 10, 2009.

BACKGROUND

1. Technical Field

The present invention relates to a writing device and an image display device.

2. Related Art

A display medium such as an electronic paper is known.

SUMMARY

According to one aspect of the invention, there is provided a writing device, including: a voltage application unit that applies a voltage to a display medium including a first display layer, second display layer and a photoconductive layer, the first display layer transforming into a first state reflecting first light having first wavelength or a second state transmitting the first light in response to an applied voltage, the second display layer transforming into a third state reflecting second light having second wavelength or a fourth state transmitting the second light in response to an applied voltage, the photoconductive layer causing increase of the applied voltage to the first display layer and the second display layer; an irradiating unit that irradiates light to the display medium; a storage unit that stores location information showing a location of an overwriting device that outputs light; a first obtaining unit that obtains image data showing an original image; a controller that controls the voltage application unit and the irradiating unit to cause the display medium to show an overlapped image including the obtained original image and an overwritten image overwritten on the original image, the overwritten image including a point corresponding to the location shown by the location information stored in the storage unit.

BRIEF DESCRIPTION OF THE DRAWINGS

Exemplary embodiments of the present invention will be described in detail based on the following figures, wherein.

DETAILED DESCRIPTION

1. First Exemplary Embodiment

1-1. Overall Configuration

Figure 1:
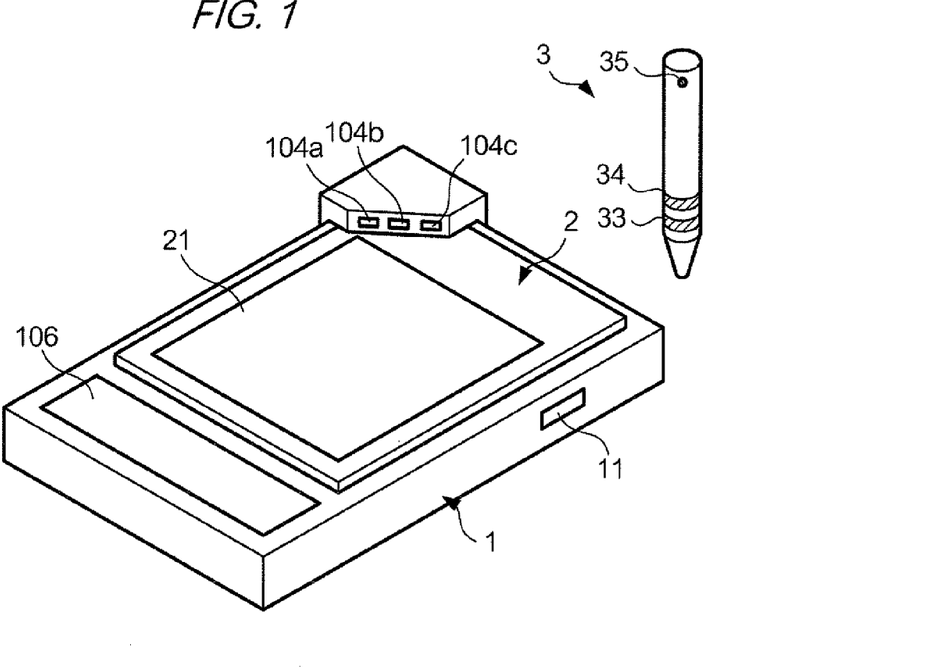
FIG. 1 shows exterior of an image display apparatus in accordance with one exemplary embodiment of the invention.

FIG. 1 shows an exterior of a display device 2, a writing device 1, and an overwriting device 3, in accordance with one exemplary embodiment of the invention.

The display device 2 is a reflective display device, which shows an image with reflected external light, e.g., light from a lighting equipment or sunlight. The display device 2 has square and planer shape. The display device 2 includes a display medium 21 including a display layer including cholesteric liquid crystal molecules, a photoconductive layer that generates a charge, and two conductive layers between which the display layer and the photoconductive layer are sandwiched.

In the display device 2, when a part of the display medium 21 is irradiated by the writing device 1 or the overwriting device 3 with pulsed voltage being applied to the conductive layers, the orientation of the cholesteric liquid crystal molecules transforms at the irradiated part. Thus, in the display medium 21, a part reflects the external light and another part transmits the external light. According to the difference of the reflectance, the display device 2 shows an image.

The overwriting device 3, which has pen-like shape in this example, is used to overwrite an additional image on an original image (already-shown image). The overwriting device 3 includes at the pen tip a light source for irradiating light. The overwriting device 3 includes an infrared ray output unit 33 and an ultrasonic output unit 34, for the writing device 1 to measure a location of the overwriting device 3.

The writing device 1 is a device for writing an image on the display device 2, which is mounted on the writing device 1 as shown in FIG. 1. The writing device 1 includes a terminal by which the writing device 1 is electrically connected to the conductive layers of the display device 2, and a light source for irradiating light. The writing device 1 applies a voltage signal via the terminal as well as irradiating light on the display device 2, so as to form an image on the display device 2.

The writing device 1 includes a sensor 104*b* that senses the infrared ray output by the overwriting device 3, and sensors 104*a* and 104*c* that sense the ultrasonic wave output by the overwriting device 3. The writing device 1 measures the location of the overwriting device 3 on the basis of the signals output by the sensors 104*a*-104*c*. The writing device 1 stores data showing trajectory of the overwriting device 3 on the display medium 21.

1-2. Configuration of Overwriting Device 3

Figure 2:
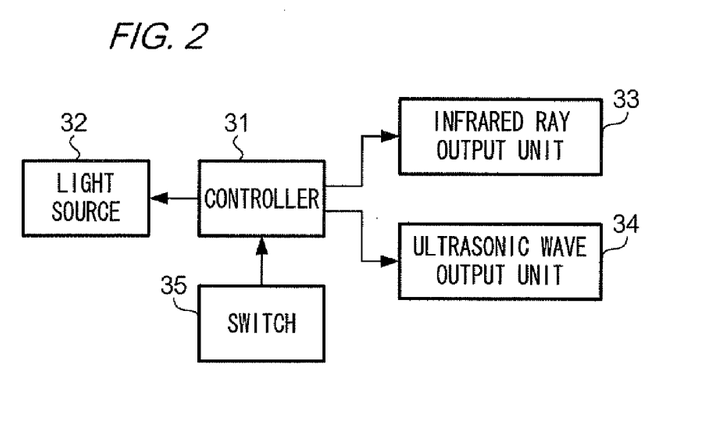
FIG. 2 shows a hardware configuration of an overwriting device 3.

FIG. 2 shows block diagram illustrating a hardware configuration of the overwriting device 3. A light source 32 includes a device that outputs a laser beam of a certain wavelength, and outputs the laser beam under the control of a controller 31.

An infrared ray output unit 33 includes a light emitting diode that outputs infrared ray, and outputs the infrared ray at a certain time period. An ultrasonic output unit 34 includes a device that outputs an ultrasonic wave, and outputs the ultrasonic wave synchronized with the time period of the infrared ray, under the control of the controller 31. A switch 35 switches active status and inactive status of the laser beam and the ultrasonic wave. The switch 35 is operably connected to the controller 31.

The controller 31 includes a so-called microcomputer, including a CPU (Central Processing Unit), a ROM (Read Only Memory), a RAM (Random Access Memory), an input port, and an output port. The ROM stores a control program for controlling an element of the overwriting device 3. When the CPU executes the control program, the CPU controls an element of the overwriting device 3. For example, the CPU controls status (active or inactive) of the laser beam and the infrared ray, by controlling an operation of the switch 35.

1-3. Configuration of Display Device 2

Figure 3:
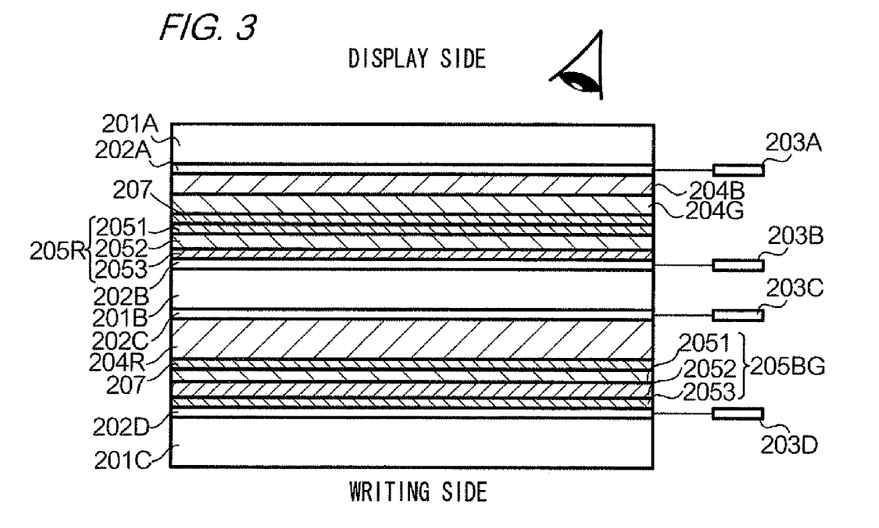
FIG. 3 schematically shows a cross sectional view of a display medium 21.

FIG. 3 schematically shows a cross sectional view of the display medium 21. The display medium 21 includes stacked layers, a substrate layer, a conductive layer, a display layer, a colored layer, a photoconductive layer, and a lamination layer. Each layer is rectangular-shaped. In an example of FIG. 3, a side of a substrate layer 201A is referred to as a display side, through which a user views an image and the writing device overwrites an image. On the other hand, a side of substrate layer 201C is referred to as a writing side, through which the writing device 1 irradiates light.

Substrate layers 201A, 201B, and 201C are layers for protecting inner layers and for maintaining the shape of the inner layers. The substrate layers 201A and 201C are exposed at the surface of the display device 2. In this example, the substrate layers are composed of polyethylene terephthalate. However, the material used for the substrate layers are not restricted to polyethylene terephthalate. Other material, satisfying requirements for transmissivity and insulation properties, for example, may be used for the substrate layers.

In this exemplary embodiment, conductive layers 202A, 202B, 202C, and 202D are composed of indium tin oxide. The conductive layers 202A, 202B, 202C, and 202D have transparency and conductivity. Alternatively, other material, satisfying requirements for transmissivity and conductivity, for example, may be used for the substrate layers.

The conductive layer 202A contacts with the writing side of the substrate layer 201A, and the conductive layer 202B contacts with the display side of the substrate layer 201B. The conductive layer 202C contacts with the writing side of the substrate layer 201B, and the conductive layer 202D contacts with the display side of the substrate layer 201C.

A terminal 203A is connected to the conductive layer 202A. A terminal 203B is connected to the conductive layer 202B. A terminal 203C is connected to the conductive layer 202C. A terminal 203D is connected to the conductive layer 202D. The terminals 203A to 203D are used for application of voltage. The terminals 203A to 203D are exposed at the surface of the display device 2.

A display layer 204B (an example of a first display layer), a display layer 204G (an example of a second display layer), and a display layer 204R are composed of plural materials, cholesteric liquid crystal and photo-transmissive resin. In the display layers 204B, 204G, and 204R, the cholesteric liquid crystal molecules are dispersed in the resin. The display layer 204B contacts with the writing side of the conductive layer 202A. The display layer 204G contacts with the writing side of the display layer 204B. The display layer 204R contacts with the writing side of the conductive layer 204C.

The cholesteric liquid crystal molecules are helicoidally-shaped and twisted. The orientation of the cholesteric liquid crystal molecules are transformed in response to electric field. Incoming light of a certain wavelength is reflected or transmitted in response to the status of the orientation of the cholesteric liquid crystal molecules. In the present exemplary embodiment, the cholesteric liquid crystal molecules in the display layer 204B reflects blue light (in a range of wavelength, approximately 400 to 500 nm). The cholesteric liquid crystal molecules in the display layer 204G reflects green light (in a range of wavelength, approximately 500 to 600 nm). The cholesteric liquid crystal molecules in the display layer 204R reflects red light (in a range of wavelength, approximately 600 to 700 nm). However, the range of wavelength reflected by the cholesteric liquid crystal molecules are not restricted to the exemplary embodiment. The cholesteric liquid crystal molecules may be prepared so as to reflect light in a certain range of wavelength.

In the display layers, the resin has functions to keep the cholesteric liquid crystal molecules and prevent fluidization of the cholesteric liquid crystal molecules (in other words, prevent degradation of an image). A high-polymer material that is not soluble in the liquid crystal, is used for the resin. A solvent that is not soluble in the liquid crystal, is used for the high-polymer material. The resin has enough mechanical strength to withstand an external force. The resin has photo-transmissivity.

The photoconductive layer 205R contacts with the display side of the conductive layer 202B. The photoconductive layer 205BG contacts with the display side of the conductive layer 202D. Photoconductive layers 205R and 205BG has an internal photoelectric effect. In the present exemplary embodiment, the photoconductive layers 205R and 205BG include charge generation layers 2051 and 2053, and a charge transport layer 2052. These layers are stacked in an order of the charge generation layer 2051, the charge transport layer 2052, and the charge generation layer 2053.

When light is irradiated to a part of the photoconductive layer, the impedance at the part of the photoconductive layer decreases. When a voltage is applied between two conductive layers that sandwich the display layer and the photoconductive layer, the applied voltage is divided into the display layer and the photoconductive layer. If the impedance of the photoconductive layer decreases, a voltage applied to the display layer increases.

The charge generation layers 2051 and 2053 absorb light and generate photo carriers in response to the absorbed light. The charge generation layer 2051 corresponds to an amount of the photo carriers transported from the conductive layer at the display side to the conductive layer at the writing side. The charge generation layer 2053 corresponds to an amount of the photo carriers transported from the conductive layer at the writing side to the conductive layer at the display side.

The photo carriers generated in the charge generation layers are injected into the charge transport layer 2052. In the charge transport layer 2052, the carriers are drifted by the electric field generated by the voltage applied to the conductive layer.

In the present exemplary embodiment, the charge generation layers of the photoconductive layer 205R includes red charge generation material (for example, dibromoanthanthrone) and absorbs blue and green light. The charge generation layers of the photoconductive layer 205BG includes blue-green charge generation material (for example, titanylphthalocyanine) and absorbs red light.

A lamination layer 207 has a function to absorb asperities and to bond the layers, when the display layer is bonded to the colored layer. The lamination layer 207 includes a high-polymer material having low glass-transition temperature. The lamination layer 207 can bond the display layer and the photoconductive layer by applying heat or pressure. The lamination layer 207 transmits incoming light. A high-polymer material having viscosity, for example, polyurethane resin, epoxy resin, acrylate resin, or silicone resin.

In the display medium 21, the orientation of the cholesteric liquid crystal molecules transforms in response to applied voltage. For example, staring from a planer orientation, the orientation of the cholesteric liquid crystal molecules transforms from the planer orientation, through a focalconic orientation, to a homeotropic orientation, with increasing an applied voltage. For another example, staring from the focalconic orientation, the orientation of the cholesteric liquid crystal molecules transforms from the focalconic orientation, to the homeotropic orientation, with increasing applied voltage.

If the voltage application is terminated at the forcalconic orientation, the forcalconic orientation is maintained without voltage application. If the voltage application is terminated at the homeotropic orientation, the orientation transforms from the homeotropic orientation to the planer orientation, and the planer orientation is maintained without voltage application.

Figure 4A:
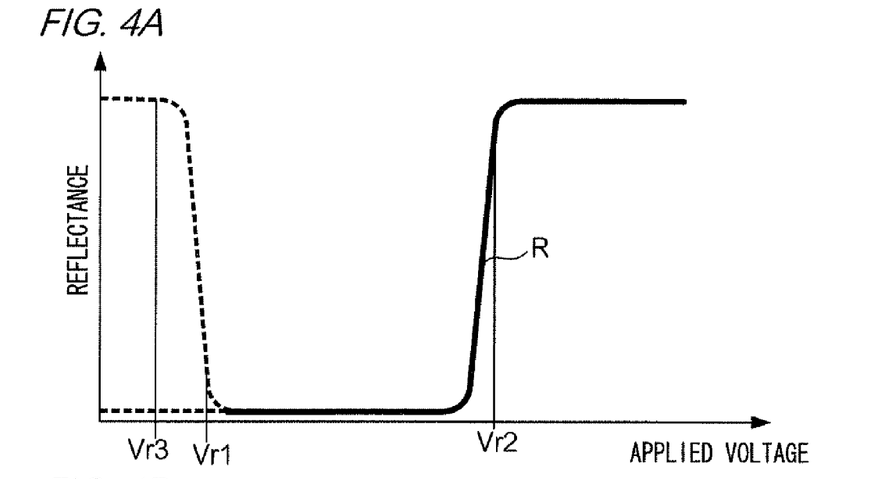
FIG. 4A shows relationship between voltage applied to a display layer and a reflectance of the display layer.
Figure 4B:
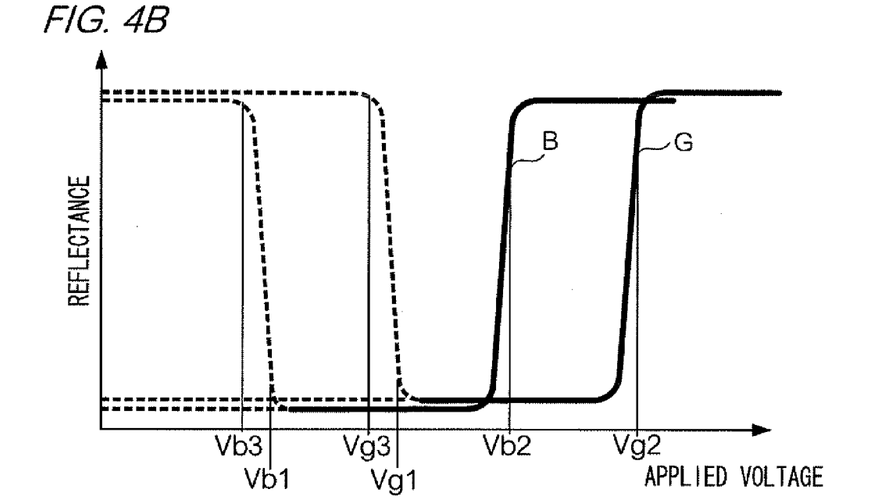
FIG. 4B shows relationship between voltage applied to the display layer and the reflectance of the display layer.

FIGS. 4A and 4B show relationship between a voltage applied to the display layer and a reflectance of the display layer. In FIG. 4A, a curve R shows relationship between the applied voltage and the reflectance of the display layer 204R. In FIG. 4B, a curve G shows relationship between the applied voltage and the reflectance of the display layer 204G. In FIG. 4B, a curve B shows relationship between the applied voltage and the reflectance of the display layer 204B.

In FIG. 4B, a voltage Vb1 denotes a threshold voltage for transformation from the planer orientation to the forcalconic orientation in the display layer 204B. A voltage Vb2 denotes a threshold voltage for transformation from the forcalconic orientation to the homeotropic orientation in the display layer 204B. In this case, if a voltage V that satisfies V>Vb2 is applied and the voltage application is terminated, the cholesteric liquid crystal molecules in the display layer 204B transform from the homeotropic orientation to the planer orientation. In the planer orientation, the display layer 204B reflects blue light. In another example, if a voltage V that satisfies Vb1<V<Vb2 is applied and the voltage application is terminated, the cholesteric liquid crystal molecules in the display layer 204B are in the focalconic orientation. In the focalconic orientation, the display layer 204B transmits incoming light.

In FIG. 4B, a voltage Vg1 denotes a threshold voltage for transformation from the planer orientation to the forcalconic orientation in the display layer 204G. A voltage Vg2 denotes a threshold voltage for transformation from the forcalconic orientation to the homeotropic orientation in the display layer 204G. In this case, if a voltage V that satisfies V>Vg2 is applied and the voltage application is terminated, the cholesteric liquid crystal molecules in the display layer 204G transform from the homeotropic orientation to the planer orientation. In the planer orientation, the display layer 204G reflects green light. In another example, if a voltage V that satisfies Vg1<V<Vg2 is applied and the voltage application is terminated, the cholesteric liquid crystal molecules in the display layer 204G are in the focalconic orientation. In the focalconic orientation, the display layer 204G transmits incoming light.

In FIG. 4A, a voltage Vr1 denotes a threshold voltage for transformation from the planer orientation to the forcalconic orientation in the display layer 204R. A voltage Vr2 denotes a threshold voltage for transformation from the forcalconic orientation to the homeotropic orientation in the display layer 204R. In this case, if a voltage V that satisfies V>Vr2 is applied and the voltage application is terminated, the cholesteric liquid crystal molecules in the display layer 204R transform from the homeotropic orientation to the planer orientation. In the planer orientation, the display layer 204R reflects red light. In another example, if a voltage V that satisfies Vr1<V<Vr2 is applied and the voltage application is terminated, the cholesteric liquid crystal molecules are in the focalconic orientation. In the focalconic orientation, the display layer 204R transmits incoming light.

As described above, the orientation of the cholesteric liquid crystal molecules is transformed into the focalconic orientation if the applied voltage is greater than the first threshold voltage, Vr1, Vg1, or Vb1. In this exemplary embodiment, the first threshold voltage is defined as a voltage at which the reflectance of the display layer is 10%. The orientation of the cholesteric liquid crystal molecules is transformed into the homeotropic orientation if the applied voltage is greater than a second threshold voltage, Vr2, Vg2, or Vb2. In this exemplary embodiment, the first threshold voltage is defined as a voltage at which the reflectance of the display layer is 90%. It is to be noted that the definition of the threshold voltage is not restricted to the exemplary embodiment.

1-4. Configuration of Writing Device 1

Figure 5:
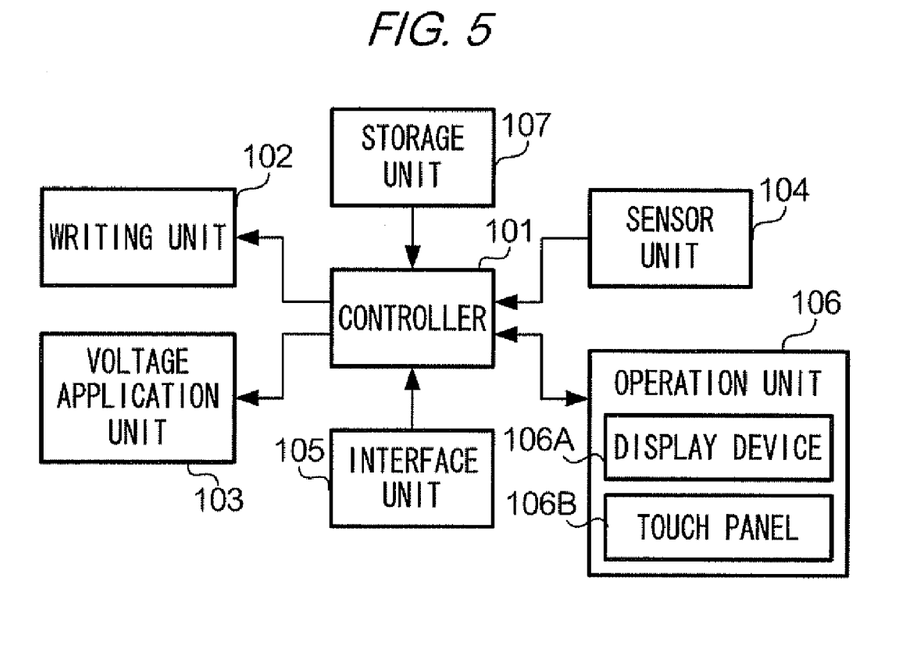
FIG. 5 schematically shows a hardware configuration of a writing device 1.

FIG. 5 schematically shows a hardware configuration of the writing device 1. A controller 101 includes a microcomputer including a CPU, a ROM, a RAM, an input port, and an output port. The ROM stores a control program for controlling elements of the writing device 1. The CPU controls the elements in accordance with the control program. For example, the control program causes the writing device to execute a process for displaying an image on the display device 2, a process for storing a measured trajectory of the overwriting device 3, and a process for overwriting an additional image on original image already shown on the display device 2.

A writing unit 102 (an example of a light irradiating unit) irradiates light to the photoconductive layers 205R or 205BG in the display medium 21. The writing unit 102 is controlled by the controller 101 in accordance with image data. The light has narrow band width of wavelength having a peak intensity at a wave length range absorbed by the photoconductive layers 205R or 205BG. The light has spectrum including energy corresponding to a wavelength range absorbed by the photoconductive layers 205R or 205BG.

The writing unit 102 includes a homogeneous light source such as, for example, arrayed light sources (for example, cold-cathode tubes, xenon lamps, halogen lamps, LEDs (Light Emitting Diodes), or EL (Electro Luminescence) devices) or a combination of light source and light guide plate.

Alternatively, the writing unit 102 may includes a photochromic device (for example, LCD (Liquid Crystal Display) or photo mask) or a surface-emitted display (for example, a CRT (Cathode Ray Tube), a PDP (Plasma Display Panel), an EL display, an LED display, an SED (Surface-conduction Electron-emitter Display).

Further alternatively, the writing unit 102 may includes a combination of the above mentioned light source, the photochromic device, or the surface-emitted display and an optical element (for example, a macro lens array, a prism array, a view angle alignment sheet).

A voltage application unit 103 includes a terminal for connecting the terminal 203A, and a terminal for connecting the terminal 203B. The voltage application unit 103 applies a pulsed-alternate-voltage signal to the conductive layers 202A and 202B through these terminals. Further, the voltage application unit 103 includes a terminal for connecting the terminal 203C, and a terminal for connecting the terminal 203D. The voltage application unit 103 applies a pulsed-alternate-voltage signal to the conductive layers 202C and 202D through these terminals.

A sensor unit 104 includes sensors 104a, 104b, and 104c. The sensor 104b senses infrared rays output by the overwriting device 3. The sensors 104a and 104c sense ultrasonic waves output by the overwriting device 3. The sensor 104b outputs a signal showing the measured infrared rays. The sensors 104a and 104c output a signal showing the sensed ultrasonic waves.

An interface unit 105 includes a terminal through which a card-shaped memory card is connected. The card-shaped memory includes a flash memory. The interface unit 105 functions as an interface used for reading data from the memory card.

An operation unit 106 includes a display device 106A and a touch panel 106B. The display device shows an image. The touch panel 106B is transmissive and mounted on the surface of the display device 106A. The display 106A shows on screen an image for operate the writing device 1, under the control of the controller 101. The touch panel 106B outputs to the controller 101a signal showing a location that a user touched.

A storage unit 107 includes a non-volatile memory and stores data (location information, trajectory information or time-series location information) showing locations (or trajectory) of the overwriting device 3 on the surface of the display device 2.

1-2. Operation

Next, operations of the device in accordance with the present exemplary embodiment is described. In the following example, an original image in accordance with the image data stored in the memory card is shown on the screen of the display device 2, and the overwriting device 3 is used for overwriting an additional image on the original image.

A user mounts the display device 2 on the writing device 1 so that the voltage application unit 103 and terminals 203A to 203D are electrically connected. The memory card that stores image data (or image information) showing an image is inserted into a card slot 11, so that the memory card and the interface unit 105 are connected. The controller 101 detects that the memory card is inserted into the card slot 11. The controller 101 controls the display device 106A to show a menu screen including filenames of the image data stored in the memory card.

When the user selects a filename by touching the touch panel 106B, image data corresponding to the selected filename is read from the memory card and an image is shown on the screen of the display device 106A in accordance with the image data.

When the user inputs through the touch panel 106B an instruction to show an image shown on the display device 106A, on the screen of the display device 2, the following operation is performed.

First, the controller 101 controls the voltage application unit 103 and the writing unit 102 to transform the orientation of the cholesteric liquid crystal molecules of the display layers 204B, 204G and 204R into the planer orientation. It is to be noted that this step may be omitted.

The voltage application unit 103 applies a pulsed-alternate voltage signal (hereinafter, referred to as a "pulse signal") between the terminals 203A and 203B. Here, a maximum voltage (or an effective voltage) of the amplitude of the pulse signal is equal to or greater than Vg2, so that the orientation of the cholesteric liquid crystal molecules in the display layers 204B and 204G is transformed into the homeotropic orientation. After the orientation is transformed into the homeotropic orientation, the application of the pulse signal is terminated so that the orientation is transformed into the planer orientation.

In the planer orientation, the display layer 204B reflects blue light and the display layer 204G reflects green light.

The voltage application unit 103 applies a pulse signal to the terminals 203C and 203D. Here, maximum voltage (or an effective voltage) of the amplitude of the pulse signal is equal to or greater than Vr2, so that the orientation of the cholesteric liquid crystal molecules in the display layer 204R is transformed into the homeotropic orientation. After the orientation is transformed into the homeotropic orientation, the application of the pulse signal is terminated so that the orientation is transformed into the planer orientation. In the planer orientation, the display layer 204R reflects red light.

After the operation for changing the orientation of the cholesteric liquid crystal molecules into the planer orientation, the voltage application unit 103 terminates the application of the voltage to the terminals 203A to the 203D.

Figure 7:
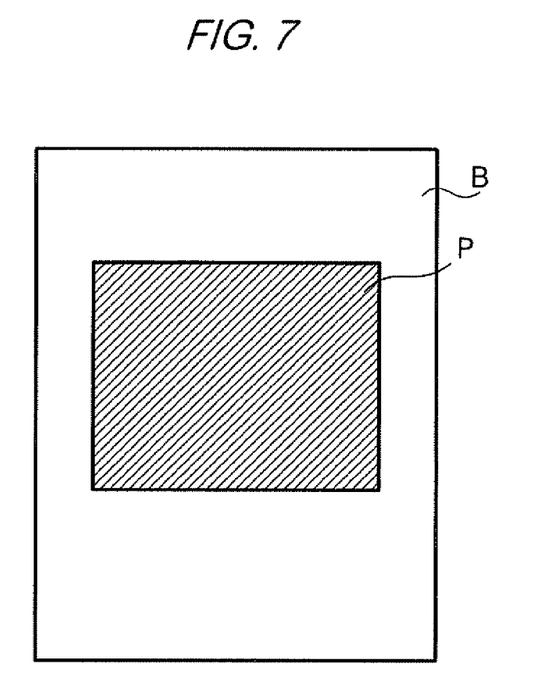
FIG. 7 shows an example of an original image shown on the display medium 21.

Then, the writing device 1 controls the writing unit 102 and the voltage application unit 103 in accordance with the image data selected by the user. In this example, the image data shows an image having white background B and a rectangular area P whose color is magenta, described by three primary colors of red, green and blue, as shown in FIG. 7.

The voltage application unit 103 applies a pulse signal to the conductive layers 202A and 202B. By the pulse signal, an effective voltage within a range between Vg2 and Vb2 is applied to the display layers 204B and 204G. In the display layer 204B, the orientation of the cholesteric liquid crystal molecules is transformed into the homeotropic orientation. In the display layer 204G, the orientation of the cholesteric liquid crystal molecules is transformed into the focalconic orientation.

With the voltage application, the writing unit 102 is controlled in accordance with the image data. For pixels having a green component, the writing unit 102 irradiates blue light so that the impedance of the photoconductive layer 205R decreases. For the part at which the impedance decreases, the effective voltage applied to the display layers 204G and 204B exceeds Vg2 and the orientation is transformed into the homeotropic orientation. After that, when the application of the pulse signal is terminated, the irradiated part of the display layer 204G is transformed into the planer orientation while the non-irradiated part of the display layer 204G is transformed into the focalconic orientation. When the application of the pulse signal is terminated, all part of the display layer 204B is transformed into the planer orientation.

Next, the voltage application unit 103 applies a pulse signal for applying to the conductive layers 202A and 202B an effective voltage Vb3, which satisfies Vb3≦Vb1. The orientation of the liquid crystal molecules in the display layer 204G is maintained as determined by the previous step. The orientation of the liquid crystal molecules in the display layer 204B is maintained as the planer orientation.

When applying the pulse signal, for pixels having a blue component, the writing unit 102 irradiates blue light so that the impedance of the photoconductive layer 205R decreases. For the part at which the impedance decreases, effective voltage applied to the display layers 204G and 204B increases so that the effective voltage is within a range between Vb1 and Vg1. After that, when the application of the pulse signal is terminated, the irradiated part of the display layer 204B is transformed into the focalconic orientation while the non-irradiated part of the display layer 204G is transformed into the planer orientation. When the application of the pulse signal is terminated, all part of the display layer 204G is maintained as determined by the previous step.

Further, the voltage application unit 103 applies a pulse signal for applying to conductive layers 202C and 202D an effective voltage within a range between Vr1 and Vr2 so that the orientation of the display layer 204R transforms into the focal conic orientation.

When applying the pulse signal, for pixels having a red component, the writing unit 102 irradiates red light so that the impedance of the photoconductive layer 205BG decreases. For the part at which the impedance decreases, the effective voltage applied to the display layer 204R increases so that the effective voltage is equal to or greater than Vr2. After that, when the application of the pulse signal is terminated, the irradiated part of the display layer 204R is transformed into the planer orientation while the non-irradiated part of the display layer 204G is transformed into the focalconic orientation.

At this point of time, for the area of the background B in the display medium 21, the display layer 204R reflects red light, the display layer 204B reflects blue light, and the display layer 204G reflects green light. Therefore, the area of the background B is shown as white. For the area P in the display medium 21, the display layer 204G does not reflect green light (or transmits green light), the display layer 204R reflects red light, and the display layer 204B reflects blue light. Therefore, the area P is shown as magenta.

When the user inputs an instruction to initiate overwriting an additional image, through the touch panel 106B after the image shown in FIG. 7 is shown on the display device, the controller 101 initiates to monitor a signal output from the sensor unit 104. Further, the controller 101 controls the voltage application unit 103 to apply a pulse signal to terminals 203A to 203D. In this example, an effective voltage applied to the display layers 204B and 204G through the terminals 203A and 203B is equal to or smaller than the voltage Vb3. An effective voltage applied to the display layer 204R through the terminals 203C and 203D is equal to or smaller than the voltage Vr3.

If a user holds the overwriting device 3 near the surface of the display device 2 and operates the switch 35, the light source 32 of the overwriting device 3 outputs a laser beam. Further, the infrared output unit 33 periodically outputs an infrared ray and the ultrasonic wave output unit 34 periodically outputs an ultrasonic wave. Here, if the user moves the writing device along the surface of the display device 2 so that the overwriting device 3 has a trajectory P2 shown in FIG. 8, an effective voltage V applied to the irradiated part of the display layer 204R increases as Vr1<V<Vr2, by the photoelectric effect at the photoconductive layer 205BG. Then, at the irradiated part of the display layer 204R, the cholesteric liquid crystal molecules transform into the focalconic orientation, thereby the irradiated part of the display layer 204R transmits red light. Further, an effective voltage V applied to the irradiated part of the display layers 204B and 204G increases as Vb1<V<Vb2, by the photoelectric effect at the photoconductive layer 205R. Then, at the irradiated part of the display layer 204B, the cholesteric liquid crystal molecules transform into the focalconic orientation, thereby the display layer 204B transmits blue light. In conclusion, for the area P2, the display layers 204B and 204R transmit lights, thereby the area P2 is shown as blue-less and red-less. In other words, a distinct line is overwritten. In the present exemplary embodiment, the control of the orientation is applied only to the display layer 204B, which has lower threshold voltage for transformation from the planer orientation into the focalconic orientation. Therefore, the control of the orientation is easier compared with a case that both the orientation of the display layers 204 B and 204 G are controlled.

Until the user inputs an instruction to terminate the overwrite, the sensor 104b senses the infrared ray periodically output from the overwriting device 3 and the sensors 104a and 104c senses the ultrasonic wave output from the overwriting device 3 synchronized with the infrared ray.

When the sensor 104b senses the infrared ray, the sensor 104b outputs a signal indicating that the infrared ray is sensed. Also, when the sensors 104a and 104c sense the infrared ray, the sensors 104a and 104c output a signal indicating that the ultrasonic wave is sensed.

The controller 101 calculates a location of the overwriting device 3 by trigonometry using time difference between times when each of the sensors outputs the signals and spatial distance between the sensors 104a and 104b. The controller 101 stores the spatial distance between the sensors 104a and 104b prior to the operation. The controller 101 stores location data showing the calculated location into the storage unit 107. In this exemplary embodiment, the controller calculates the location when the signals are input from the sensors, and stores the location data when the location is calculated. In other words, the controller 101 and the storage unit 107 function as storage unit that stores the location data. For example, if the infrared rays are detected at solid points shown in FIG. 8, the controller 101 stores location data showing the sequential location of the solid points into the storage unit 107. In other words, the location data shows trajectory of the overwriting device 3.

Figure 9:
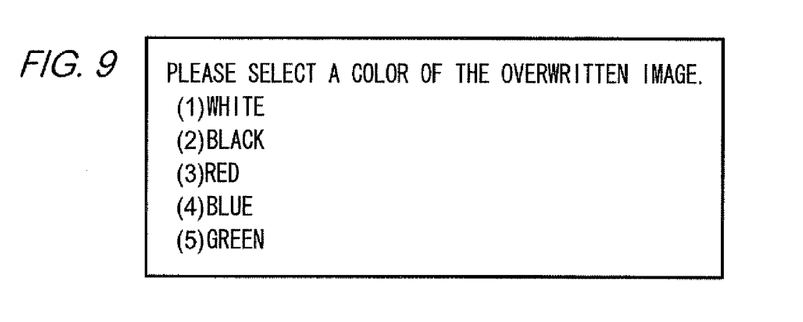
FIG. 9 shows an example of a menu screen.

When the user operates the switch 35, the overwriting device 3 terminates outputting the laser beam, the infrared ray, and the ultrasonic waves. After this, if the user operates the touch panel 106B to input an instruction terminate the overwriting, the controller 101 terminates monitoring the signals output from the sensors 104. Then, the controller 101 controls the display device 106A to show a screen (as shown in FIG. 9) for prompting a user to select a color of the overwritten image (or additional image).

When the user operates the touch panel 106B to input an instruction to select a color (for example, blue), the controller 101 initiates an operation to change the color of the overwritten image into the selected color, as described below.

The writing device 1 controls the writing unit 102 and the voltage application unit 103 with image data selected by the user and the trajectory data stored in the storage unit 107.

Specifically, first, the controller 101 read the location data stored in the storage unit 107. The controller 101 generates an image of a line sequentially connecting the points shown by the location data. The controller 101 determines the color of the line, in response to the selection of the user (in this example, blue). Further, the controller 101 generates an overlapped image in which the line image is overlapped on the image shown in FIG. 7. It is to be noted that the line image shows the trajectory of the writing device, in other words, the line image shows the overwritten image.

Next, the controller 101 controls the writing unit 102 and the voltage application unit 103 with the generated overlapped image data, similarly to the operation for showing an image shown by the image data.

For controlling the orientation of the display layer 204G, light irradiation is controlled in accordance with the green component of the overlapped image data. For this example, the area P2 is not irradiated and the liquid crystal molecules in the display layer 204G is transformed into the focalconic orientation. As a result, the display layer 204G transmits the green light.

For controlling the orientation of the display layer 204B, light irradiation is controlled in accordance with the blue component of the overlapped image data. For this example, the area P2 is not irradiated and the liquid crystal molecules in the display layer 204B is transformed into the planer orientation. As a result, the display layer 204B reflects the blue light.

For controlling the orientation of the display layer 204R, light irradiation is controlled in accordance with the red component of the overlapped image data. For this example, the area P2 is irradiated and the liquid crystal molecules in the display layer 204B is transformed into the focalconic orientation. As a result, the display layer 204R transmits the red light.

By the control, the background B is shown as white (reflecting red, blue and green light), the area P2 is shown as blue (reflecting blue light and transmitting red and green light), and the area P other than area P2 is shown as magenta (reflecting blue and red light and transmitting green light). In conclusion, the overwritten image (shown as the area P2 in FIG. 8) is shown as blue, which is the color selected by the user.

Figure 8:
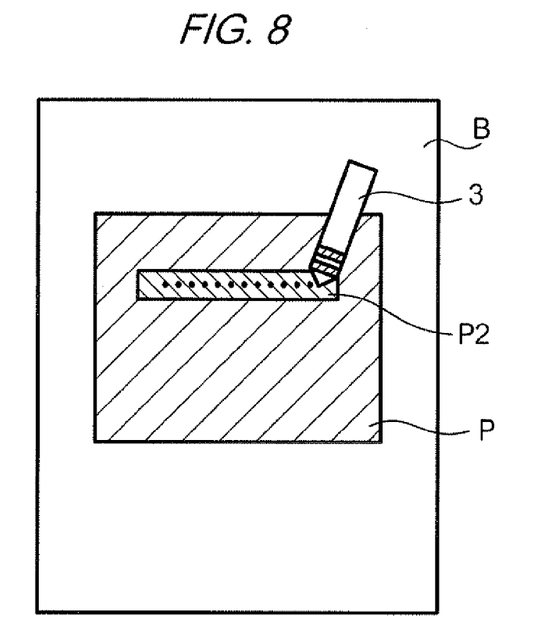
FIG. 8 shows an example of an overlapped image.

In another example, if the user selects green for the area P2, the controller 101 generates the overlapped image data including the green component for the area P2. In this example, the area P2 is irradiated when controlling the orientation in the display layer 204G, the area P2 is irradiated when controlling the orientation in the display layer 204B, the area P2 is irradiated when controlling the orientation in the display layer 204R.

In the above example, the pulse signals are applied to the conductive layers 202A to 202D when the overwriting device 3 irradiates light. However, the pulse signals may be applied only to the conductive layers 202C and 202D. In other words, only the display layer 204R may be controlled when overwriting is performed. Alternatively, the pulse signals may be applied only to the conductive layers 202A and 202B. In other words, only the display layers 204B and 204G may be controlled when overwriting is performed.

2. Second Exemplary Embodiment

A second embodiment of the invention will be described in this section. In the second exemplary embodiment, the configuration of the display medium 21 is different from that of the first exemplary embodiment.

2-1. Configuration of Display Device 2

Figure 11:
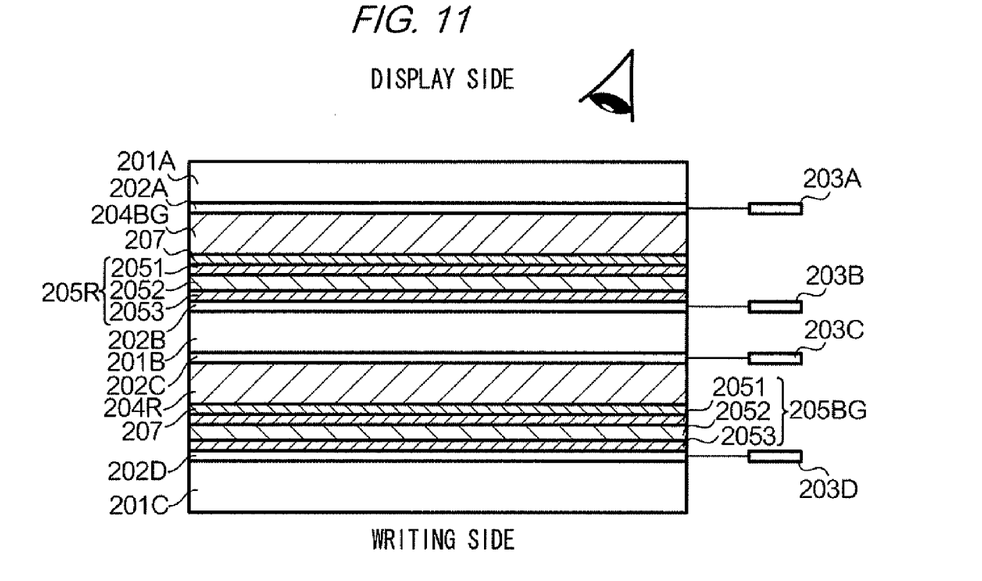
FIG. 11 schematically shows a cross sectional view of a display medium 21 in accordance with a second embodiment.

FIG. 11 schematically shows a cross section of the display medium 21 of the display device 2 in accordance with the second exemplary embodiment of the invention. The display medium 21 includes stacked substrate layers, conductive layers, display layers, photoconductive layers, and lamination layers. In FIG. 11, a side near the substrate layer 201A is a display side, through which a user view an image and the overwriting device 3 irradiates light. A side near the substrate layer 201C is a writing side, through which the overwriting device 3 irradiates light. The layers of the display medium have rectangular shape. It is to be noted that in FIG. 11, reference numerals the same as the first exemplary embodiment are used. In the following description, description for features the same as the first exemplary embodiment is omitted.

A display layer 204BG contacts to the writing side of the conductive layer 202A. The display layer 204R contacts to the writing side of the conductive layer 202C. The display layers 204BG and 204R includes the cholesteric liquid crystal molecules and the resin transmitting light. In the display layers 204BG and 204R, the cholesteric liquid crystal molecules are dispersed in the resin. In this exemplary embodiment, the cholesteric liquid crystal molecules in the display layer 204BG is prepared to reflect blue-green light and the cholesteric liquid crystal molecules in the display layer 204R is prepared to reflect red light.

Figure 12:
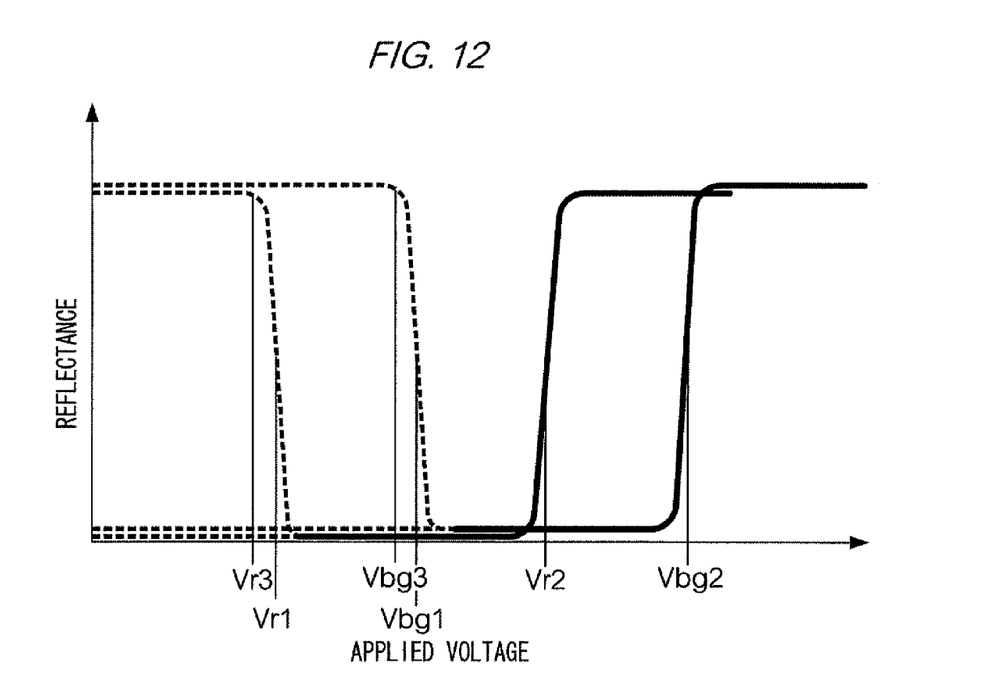
FIG. 12 shows relationship between voltage applied to a display layer and a reflectance of the display layer in accordance with the second embodiment.

FIG. 12 shows relationship between voltage applied to the display layer and the reflectance of the display layer. A voltage Vbg1 denotes a threshold voltage to transform from the planer orientation into the focalconic orientation in the display layer 204BG. A voltage Vbg2 denotes a threshold voltage to transform from the focalconic orientation into the homeotropic orientation in the display layer 204BG. If a voltage equal to or greater than the voltage Vbg2 is applied and the applied voltage is turned off, the cholesteric liquid crystal molecules transform into the planer orientation thereby reflecting blue-green light.

If a voltage within a range between Vbg1 and Vbg2 is applied and the applied voltage is turned off, the cholesteric liquid crystal molecules in the display layer 204BG transform into the focalconic orientation thereby transmitting incoming light.

A voltage Vr1 denotes a threshold voltage to transform from the planer orientation into the focalconic orientation in the display layer 204R. A voltage Vr2 denotes a threshold voltage to transform from the focalconic orientation into the homeotropic orientation in the display layer 204R. If a voltage equal to or greater than the voltage Vr2 is applied and the applied voltage is turned off, the cholesteric liquid crystal molecules transform into the planer orientation thereby reflecting red light.

If a voltage within a range between Vbg1 and Vbg2 is applied and the applied voltage is turned off, the cholesteric liquid crystal molecules in the display layer 204R transform into the focalconic orientation thereby transmitting incoming light.

In the present exemplary embodiment, the threshold voltages in display layers 204BG and 204R are different from each other. However, the threshold voltages in display layers 204BG and 204R may be the same in a case that each of plural display layers is sandwiched by a different pair of conductive layers.

2-2. Operation

Next, operations of the second exemplary embodiment is described. In the following example, an image in accordance with the image data stored in the memory card is shown on the screen of the display device 2, and the overwriting device 3 is used for overwriting an image on the already-shown image.

A user mounts the display device 2 on the writing device 1 so that the voltage application unit 103 and terminals 203A to 203D are electrically connected. The memory card that stores image data (or image information) showing an image is inserted into a card slot, so that the memory card and the interface unit 105 are connected. The controller 101 detects that the memory card is inserted into the card slot. The controller 101 controls the display device 106A to show filenames of the image data stored in the memory card.

When the user selects a filename by touching the touch panel 106B, image data corresponding to the selected filename is read from the memory card and an image is shown on the screen of the display device 106A in accordance with the image data.

When the user inputs through the touch panel 106B an instruction to show an image shown on the display device 106A, on the screen of the display device 2, the following operation is performed.

First, the controller 101 controls the voltage application unit 103 and the writing unit 102 to transform the orientation of the cholesteric liquid crystal molecules of the display layers 204B, 204G and 204 R into the planer orientation.

The voltage application unit 103 applies a pulsed-alternate voltage signal (hereinafter, referred to as a "pulse signal") between the terminals 203A and 203B. Here, an effective voltage of the amplitude of the pulse signal is equal to or greater than Vbg2, so that the orientation of the cholesteric liquid crystal molecules in the display layers 204BG is transformed into the homeotropic orientation. After the orientation is transformed into the homeotropic orientation, the application of the pulse signal is terminated so that the orientation is transformed into the planer orientation. In the planer orientation, the display layer 204B reflects blue light and the display layer 204G reflects green light.

The voltage application unit 103 applies a pulse signal to the terminals 203C and 203D. Here, an effective voltage of the amplitude of the pulse signal is equal to or greater than Vr2, so that the orientation of the cholesteric liquid crystal molecules in the display layers 204B and 204G is transformed into the homeotropic orientation. After the orientation is transformed into the homeotropic orientation, the application of the pulse signal is terminated so that the orientation is transformed into the planer orientation. In the planer orientation, the display layer 204R reflects red light.

Then, the writing device 1 controls the writing unit 102 and the voltage application unit 103 in accordance with the image data selected by the user. In this example, the selected image data shows an image shown in FIG. 7. A background B is shown as pale yellow, and an area P is shown as red.

The voltage application unit 103 applies a pulse signal to the terminals 203A and 203B. By the pulse signal, a voltage applied to the display layer 204BG is equal to or smaller than a voltage Vbg3.

The writing unit 102 outputs light having a wavelength absorbed by the conductive layer 105R. In this example, only the area P is irradiated by the writing unit 102.

By the irradiation, the impedance of the photoconductive layer 205R in the area P decreases and the voltage applied to the display layer 204BG in the area P increases to a voltage within a range between Vbg1 and Vbg2. As a result, the cholesteric liquid crystal molecules in the display layer 204BG at the area P transform into the focalconi orientation, thereby the area P of the display layer 204BG reflects blue-green light.

At this point of time, all area of the display layer 204R reflects red light. Therefore, for the background B, the display layer 204R reflects red light and the display layer 204BG reflects blue-green light, thereby the background B is shown as pale yellow. For the area P, the display layer 204BG does not reflect blue-green light (or transmits blue-green light), thereby the area P is shown as red.

When the user inputs an instruction to initiate overwriting an image, through the touch panel 106B after the image shown in FIG. 7 is shown on the display device, the controller 101 initiates to monitor a signal output from the sensor unit 104. Further, the controller 101 controls the voltage application unit 103 to apply a pulse signal to terminals 203C and 203D. In this example, an effective voltage applied to the display layers 204R is equal to or smaller than the voltage Vr3 (see FIG. 12).

If a user holds the overwriting device 3 near the surface of the display device 2 and operates the switch 35, the light source 32 of the overwriting device 3 outputs a laser beam. Further, the infrared output unit 33 periodically outputs an infrared ray and the ultrasonic wave output unit 34 periodically outputs an ultrasonic wave.

Here, if the user moves the writing device along the surface of the display device 2 so that the overwriting device 3 has a trajectory P2 shown in FIG. 8, an effective voltage V applied to the irradiated part of the display layer 204BG increases as Vr1<V<Vr2, by the photoelectric effect at the photoconductive layer 205BG.

Then, at the irradiated part of the display layer 204B, the cholesteric liquid crystal molecules transform into the focalconic orientation, thereby the irradiated part of the display layer 204R transmits red light. In conclusion, for the area P2, the display layers 204BG and 204R transmit light, thereby the area P2 is shown as black. In other words, a distinct line is overwritten.

Until the user inputs an instruction to terminate the overwrite, the sensor 104b senses the infrared ray periodically output from the overwriting device 3 and the sensors 104a and 104c senses the ultrasonic wave output from the overwriting device 3 synchronized with the infrared ray.

When the sensor 104b senses the infrared ray, the sensor 104b outputs a signal indicating that the infrared ray is sensed. Also, when the sensors 104a and 104c sense the infrared ray, the sensors 104a and 104c output a signal indicating that the ultrasonic wave is sensed.

The controller 101 calculates a location of the overwriting device 3 and stores location data showing the calculated location into the storage unit 107.

Figure 13:
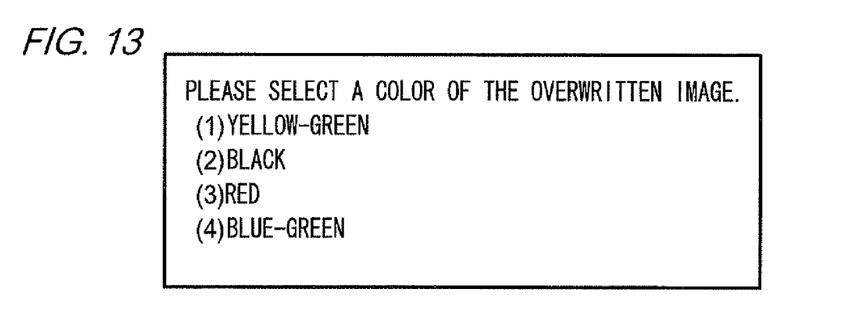
FIG. 13 shows an example of a menu screen.

When the user operates the switch 35, the overwriting device 3 terminates outputting the laser beam, the infrared ray, and the ultrasonic waves. After this, if the user operates the touch panel 106B to input an instruction terminate the overwriting, the controller 101 terminates monitoring the signals output from the sensors 104. Then, the controller 101 controls the display device 106A to show a screen (as shown in FIG. 13) for prompting a user to select a color of the overwritten image.

When the user operates the touch panel 106B to input an instruction to select a color (for example, blue-green), the controller 101 initiates an operation to transform the color of the overwritten image into the selected color, as described below.

The writing device 1 controls the writing unit 102 and the voltage application unit 103 with image data selected by the user and the trajectory data stored in the storage unit 107.

Specifically, first, the controller 101 read the location data stored in the storage unit 107. The controller 101 generates an image of a line sequentially connecting the points shown by the location data. The controller 101 determines the color of the line, in response to the selection of the user (in this example, blue). Further, the controller 101 generates an overlapped image in which the line image is overlapped on the image shown in FIG. 7. It is to be noted that the line image shows the trajectory of the writing device, in other words, the line image shows the overwritten image.

Then, the controller 101 controls the voltage application unit 103 to apply a pulse signal to the terminals 203A and 203B. In this example, the voltage applied to the display layer 204BG is equal to or greater than Vbg3. The writing unit 102 irradiates light having wavelength absorbed by the photoconductive layer 205R, through the writing side of the display device 2. For an example shown in FIG. 8, in the display medium 21, the area P other than P2 is irradiated and the area P2 is not irradiated.

By the irradiation, the impedance of the photoconductive layer 205R in the area P decreases and the voltage applied to the display layer 204BG in the area P increases to a voltage within a range between Vbg1 and Vbg2. As a result, the cholesteric liquid crystal molecules in the display layer 204BG at the area P transform into the focalconic orientation, thereby the area P of the display layer 204BG reflects blue-green light. In this example, the area P2 is not irradiated.

Therefore, the cholesteric liquid crystal molecules maintain the planer orientation, thereby the display layer 204BG reflects blue-green light.

Then, the controller 101 controls the voltage application unit 103 to terminate voltage application to the terminals 203A and 203B. After that, the controller 101 controls the voltage application unit 103 to output a pulse signal to the terminals 203C and 203D. In this example, the voltage applied to the display layer 204R is equal to or greater than Vr3. The writing unit 102 irradiates light having wavelength absorbed by the photoconductive layer 205BG, through the writing side of the display device 2. For an example shown in FIG. 8, in the display medium 21, the area P2 is irradiated.

By the irradiation, the impedance of the photoconductive layer 205R in the area P2 decreases and the voltage applied to the display layer 204R in the area P2 increases to a voltage within a range between Vr1 and Vr2. As a result, the cholesteric liquid crystal molecules in the display layer 204R at the area P2 transform into the focalconic orientation, thereby the area P of the display layer 204BG reflects red light.

After the light is irradiated to the area P2, the controller 101 controls the voltage application unit 103 to terminate the voltage application to the terminals 203C and 203D. By the control, the background B is shown as yellow-green (reflecting red and blue-green light), the area P2 is shown as blue-green (reflecting blue-green light and transmitting red light), and the area P other than area P2 is shown as red (reflecting red light and transmitting blue-green light). In conclusion, the overwritten image (shown as the area P2 in FIG. 8) is shown as blue, which is the color selected by the user.

In another example, if the user selects black for the area P2, the controller 101 generates the overlapped image data including the no red component and no blue-green component for the area P2. In this example, the area P2 is irradiated when a pulse signal is applied to the terminals 203A and 203B, and the area P2 is irradiated when a pulse signal is applied to the terminals 203C and 203D. As a result, both the display layers 204BG and 203D transform into the focal conic orientation.

In yet another example, if the user selects yellow-green for the area P2, the controller 101 generates the overlapped image data including the red component and the blue-green component for the area P2. In this example, the area P2 is not irradiated when a pulse signal is applied to the terminals 203A and 203B, and the area P2 is not irradiated when a pulse signal is applied to the terminals 203C and 203D. As a result, both the display layers 204BG and 203D maintain the planer orientation.

3. Further Embodiments

The invention is not restricted to the embodiment described above, and various modified embodiments are possible.

In the exemplary embodiments described above, the color of the overwritten image is selected after the irradiation by the overwriting device 3 is completed. However, the color of the overwritten image may be selected before the irradiation by the overwriting device 3 is initiated.

The writing device 1 may include a communication interface. In this case, the writing device 1 may obtain the image data from a computer device via the communication interface and may control the display device 2 to show the image shown by the image data.

Method for measuring the location of the overwriting device 3 is not restricted to the exemplary embodiments described above. For example, the writing device 1 may include a touch panel mounted on the surface of the display medium 21. The touch panel may have an area approximately equal to or greater than the display medium. A user may move the overwriting device 3 with keeping contact with the touch panel. The writing device 1 may sense the location of the overwriting device 3 by the touch panel and may store the sensed location as the location data.

In such a case, the writing device 1 and the display device 2 may be electrically connected when the display device 2 is mounted on the writing device 1. The touch panel may provide a signal through the connection.

The format of the location data is not restricted to the exemplary embodiment described above. The location data may describe a line showing the trajectory of the writing device touching the touch panel.

Figure 10:
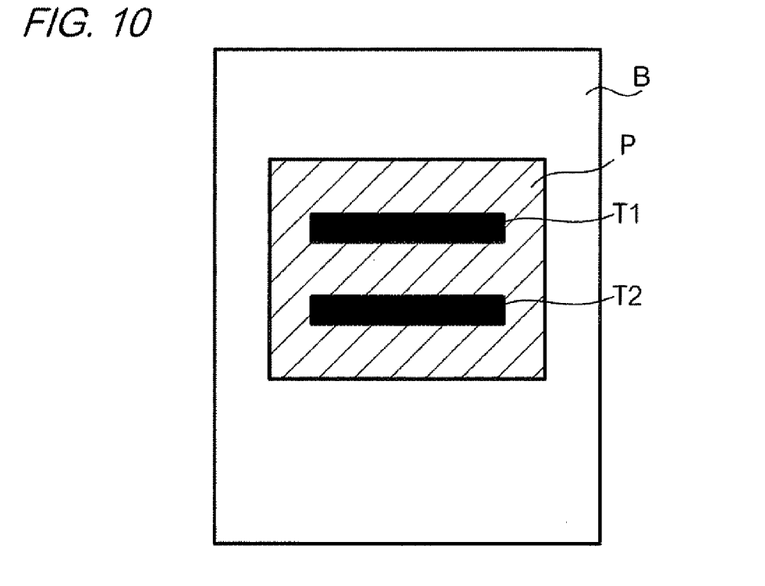
FIG. 10 shows an example of an overlapped image.

For example, as shown in FIG. 10, in a case that the user moves the overwriting device 3 touching the touch panel to draw a first trajectory T1, lifts the overwriting device 3 off the touch panel, and then moves the overwriting device 3 touching the touch panel to draw a second trajectory T2, the writing device 1 may store two distinct location data sets. One of the two distinct location data sets shows the first trajectory T1, and the other shows the second trajectory T2. The writing device 1 may control the writing unit 102 and the voltage application unit 103 to cause the display device 3 to show the two separate lines.

Figure 6:
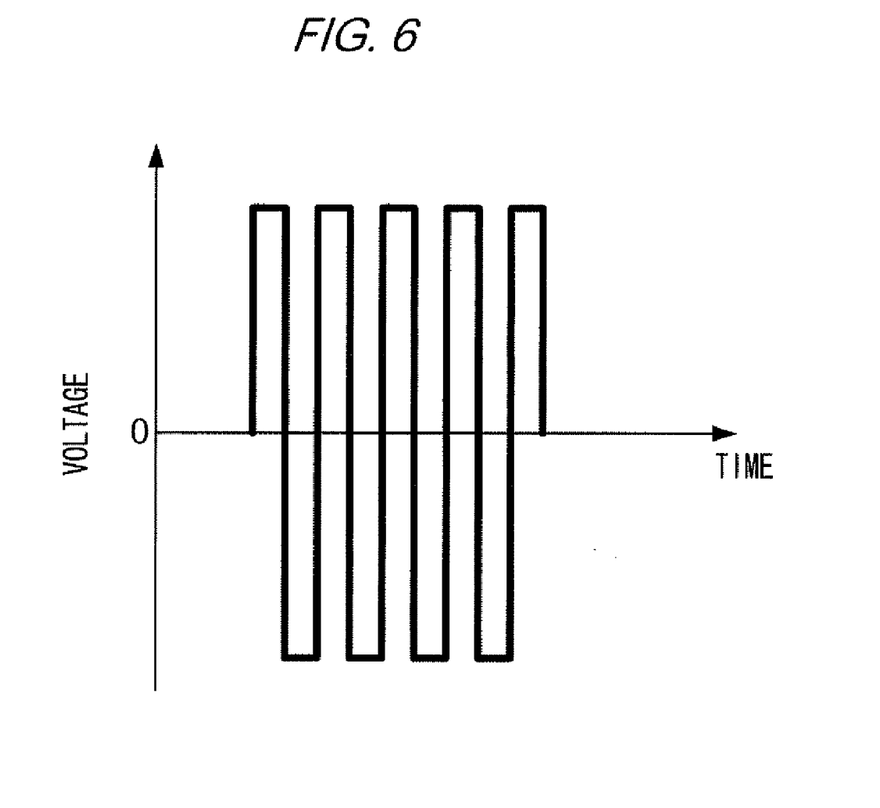
FIG. 6 shows a waveform of a voltage signal output from a voltage application unit 103.

The voltage unit 103 may apply a direct-current voltage instead of the pulse signal shown in FIG. 6.

In the exemplary embodiments described above, a menu screen for prompting a user to select a filename or a color of the overwritten image is shown on the display device 106A. The method for selecting an item shown in the menu screen is not restricted to the exemplary embodiments. The controller 101 may receive an instruction to select an item in accordance with a location touched by the overwriting device 3, for example, for a menu screen shown in FIG. 9 and FIG. 13.

In the exemplary embodiments described above, the display device 2 is detachable from the writing device 1. However, the writing device 1 and the display device 2 may have an integrated architecture. Further, the overwriting device 3 may have a wired connection with the writing device 1, and may be supplied power for driving the overwriting device 3 by the writing device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A writing device comprising:
 a voltage application unit that applies a voltage to a display medium including a first display layer, a second display layer and a photoconductive layer, the first display layer transforming into a first state reflecting a first light having a first wavelength or a second state transmitting the first light in response to a first applied voltage, the second display layer transforming into a third state reflecting a second light having a second wavelength or a fourth state transmitting the second light in response to a second applied voltage, the photoconductive layer causing increase of the applied voltage to the first display layer and the second display layer;
an irradiating unit that irradiates light to the display medium;
a storage unit that stores location information showing a location of an overwriting device that outputs light;
a first obtaining unit that obtains image data showing an original image;
a reading unit that reads the location information from the storage unit; and
a controller that controls the voltage application unit and the irradiating unit to cause the display medium to show an overlapped image including the obtained original image and an overwritten image overwritten on the original image, the overwritten image including a point corresponding to the location shown by the location information read by the reading unit.

2. The writing device of claim 1, wherein
the state of the first display layer transforms from the first state into the second state at a first threshold voltage,
the state of the second display layer transforms from the third state into the fourth state at a second threshold voltage,
the first threshold voltage is lower than the second threshold voltage,
a voltage lower than the first threshold voltage is applied to the display layers when the overwriting device irradiates the light, and
a part of the first display layer corresponding to the photoconductive layer to which the light is irradiated by the overwriting device is transformed from the first state to the second state.

3. The writing device of claim 1, further comprising:
a second obtaining unit that obtains a color of the overwritten image, wherein
the controller is configured to control the voltage application unit and the irradiating unit to cause the display medium to show the overlapped image with the overwritten image having the obtained color.

4. The writing device of claim 1, wherein
the controller is configured to control the voltage application unit and the irradiating unit to cause the display medium to show the original image before the storage unit stores the location information, and
the controller is further configured to obtain the location information after the original image is shown on the display medium.

5. An image display apparatus comprising:
an overwriting device that is held by a user and outputs light; and
the writing device of claim 1.

6. The writing device of claim 1, further comprising:
a generating unit that generates the overlapped image, wherein
the controller is configured to control the voltage application unit and the irradiating unit to cause the display medium to show the overlapped image generated by the generating unit.

7. The writing device of claim 1, wherein
at least one of the first and second display layers includes liquid crystal.

* * * * *